April 27, 1965     R. S. REAVES     3,180,441
ORCHARD TRACTOR

Filed July 15, 1963     4 Sheets-Sheet 1

Inventor
Robert S. Reaves
By
Attorney

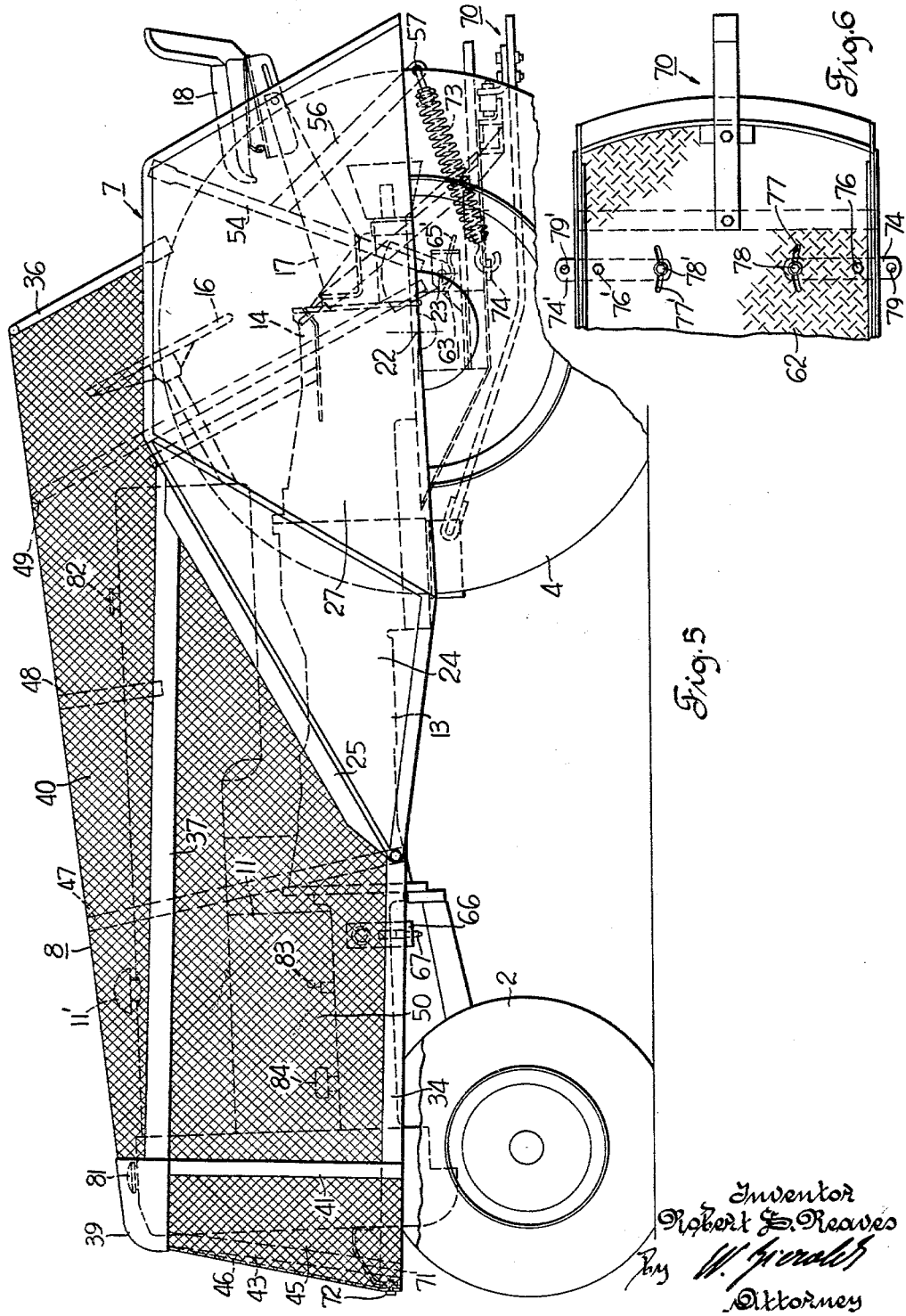

April 27, 1965
R. S. REAVES
3,180,441
ORCHARD TRACTOR
Filed July 15, 1963
4 Sheets-Sheet 4
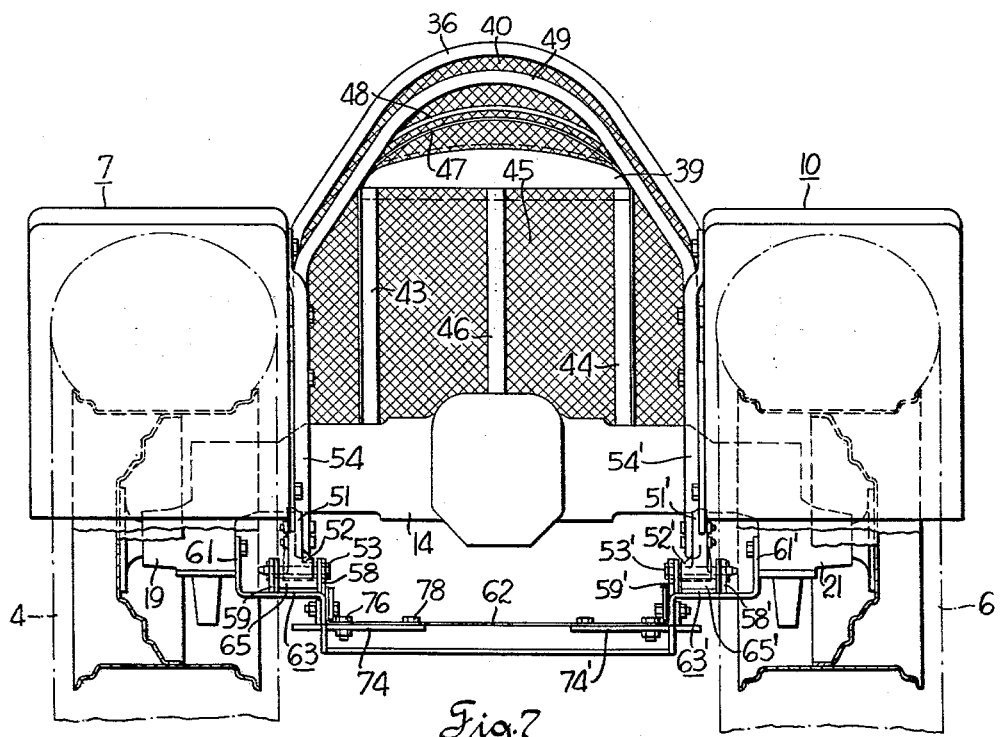
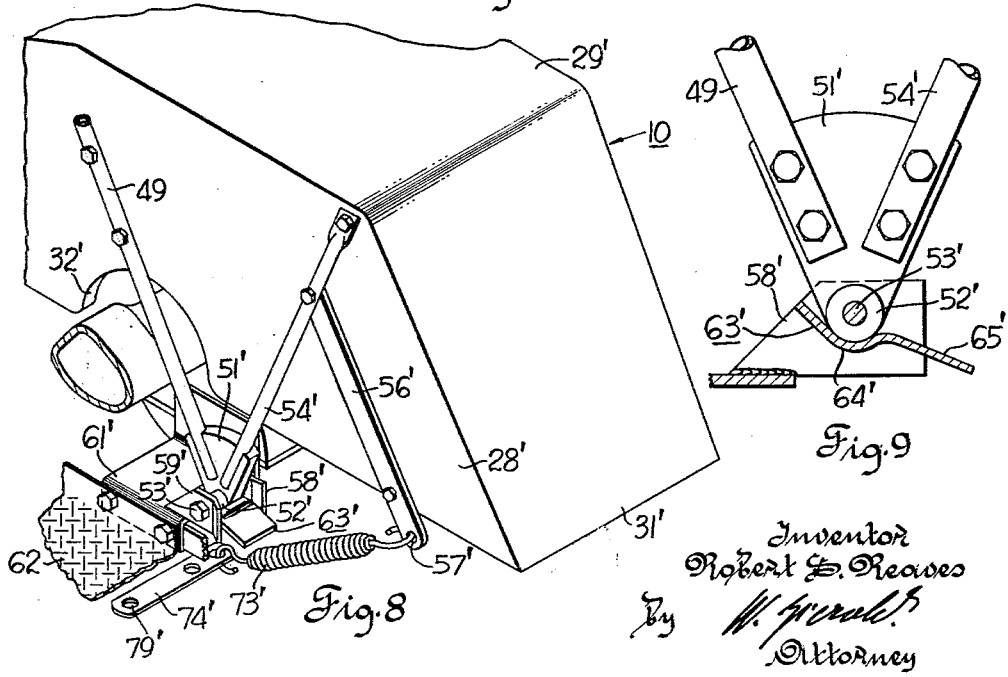
Inventor
Robert S. Reaves
By
Attorney

United States Patent Office 3,180,441
Patented Apr. 27, 1965

3,180,441
ORCHARD TRACTOR
Robert S. Reaves, Waukesha, Wis., assignor to Allis-Chalmers Manufacturing Company, Milwaukee, Wis.
Filed July 15, 1963, Ser. No. 294,960
8 Claims. (Cl. 180—1)

The invention relates to tractors, and it is concerned more particularly with a special purpose tractor for use in orchards or groves.

In orchard work, tractors operating between rows of trees to pull a disk harrow or other equipment are apt to encounter low hanging branches of the trees. To avoid or minimize the damage to which the branches and fruit may thus become subjected, it is customary to provide orchard tractors with suitable shielding, particularly for their rear wheels, which will gently deflect any branches which may be encountered by the tractor in its course under the trees.

The provision of satisfactory shielding equipment for the mentioned purpose presents several problems. For instance, the equipment should be convenient to install on and remove from the tractor; it should preferably cover not only the rear wheels of the tractor but also the top and sides of the tractor body; and it should permit ready access to the engine and other parts of the tractor which should be shielded and require periodic servicing. Further, the shielding equipment should not impair the efficiency of the engine cooling system; it should permit changing tires of the rear wheels without undue inconvenience; and the equipment should be such that it can be installed on and removed from the tractor by only one man in a relatively short time and with a minimum of labor.

Generally, it is an object of the invention to provide an improved orchard tractor incorporating shielding equipment which will take care of all of the hereinabove mentioned requirements in a practical and entirely satisfactory manner.

More specifically, it is an object of the invention to provide a drive-in type guard attachment for a tractor which will greatly facilitate the work of preparing a conventionally constructed farm tractor for orchard use, and of reconverting the tractor for general farm use.

Another object of the invention is to provide an orchard tractor with improved shielding which will deflect low hanging branches of trees not only from the propelling wheels of the tractor but also from its forward body structure including the engine and accessories such as radiator, fuel tank, air intake, steering wheel and control levers.

These and other objects and advantages are attained by the present invention, various novel features of which will be apparent from the description herein and pointed out in the appended claims.

Referring to the accompanying drawings:

FIG. 5 is an enlarged elevational side view of the orchard tractor shown in FIG. 1;

FIG. 6 is an enlarged detail view of an adjustable spring anchor shown in FIG. 5;

FIG. 7 is a rear view of the orchard tractor shown in FIG. 5, forward tractor parts being omitted and parts of the tractor rear wheels being broken away and shown in section;

FIG. 8 is an enlarged perspective view of a pivotal connection between the tractor unit and guard attachment shown in FIG. 7; and FIG. 9 is a detail view, partly in section, of parts shown in FIG. 8.

Figure 1:
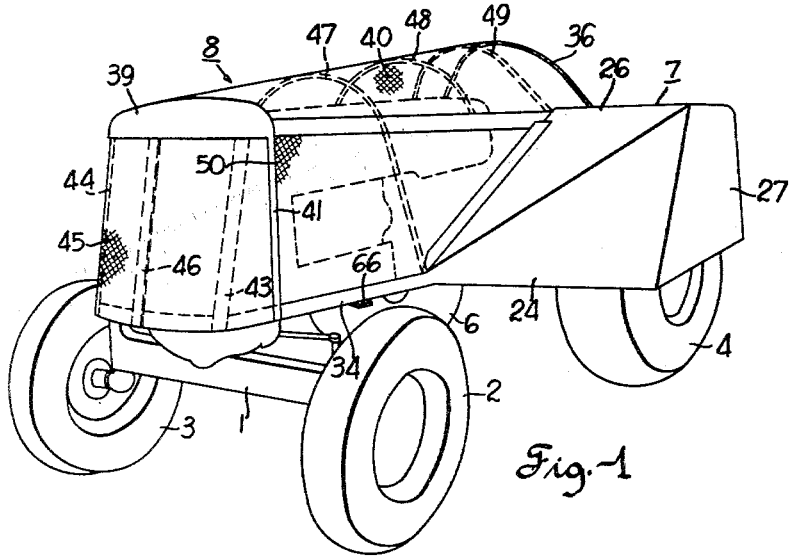
FIG. 1 is a perspective view of an orchard tractor including a unitary guard attachment in shielding relation to the rear wheels and body structure of a farm type tractor.

In FIG. 1, the front support of a self-contained tractor unit comprises an axle 1 and associated front steering wheels 2 and 3; and a pair of transversely spaced power driven rear wheels of the tractor unit are designated by the reference characters 4 and 6. The rear wheel 4 and the body structure of the tractor are shielded for orchard work by a fender section 7 and by a cowl section 8, respectively, and the rear tractor wheel 6 is shielded by another fender section, not shown in FIG. 1, which is an opposite hand duplicate of the fender section 7 and generally designated by the reference character 10 in FIG. 4.

Figure 2:
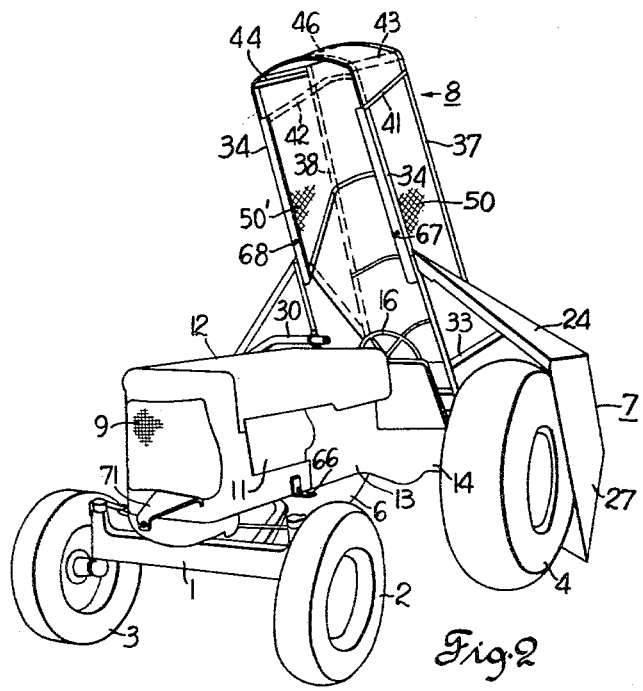
FIG. 2 is a perspective view showing the unitary guard attachment of FIG. 1 in an upwardly tilted position relative to the associated tractor.

The body structure of the tractor, as more clearly shown in FIG. 2, is of the type usually employed for farm tractors and comprises a forward radiator and grill assembly 9, an internal combustion engine 11, a bonnet and fuel tank assembly 12, a transmission housing 13, and a rear axle structure 14. A steering wheel 16 and control levers, not shown, are mounted on the tractor body in conventional manner, and a seat support 17 (FIG. 5) extends rearwardly from the rear axle housing 14 and mounts a low level operator's seat 18.

As shown in FIG. 7, the rear axle structure 14 includes a pair of depending final drive casings 19 and 21 on which the rear wheels 4 and 6 are mounted, respectively, for rotation on a common transverse axis which is indicated in FIG. 5 by the reference character 22.

The fender sections 7 and 10 and the cowl section 8 are interconnected, as will be more fully explained hereinbelow, to form a unitary guard attachment for the tractor rear wheels 4 and 6 and for the forward power plant including the engine 11 and associated components. The unitary guard attachment 7, 10, 8 is swingable on the tractor between lowered and raised positions as illustrated by FIGS. 1 and 2, respectively, about a pivot axis which is designated in FIG. 5 by the reference character 23 and which is located rearwardly of the tractor rear wheel axis 22.

Figure 3:
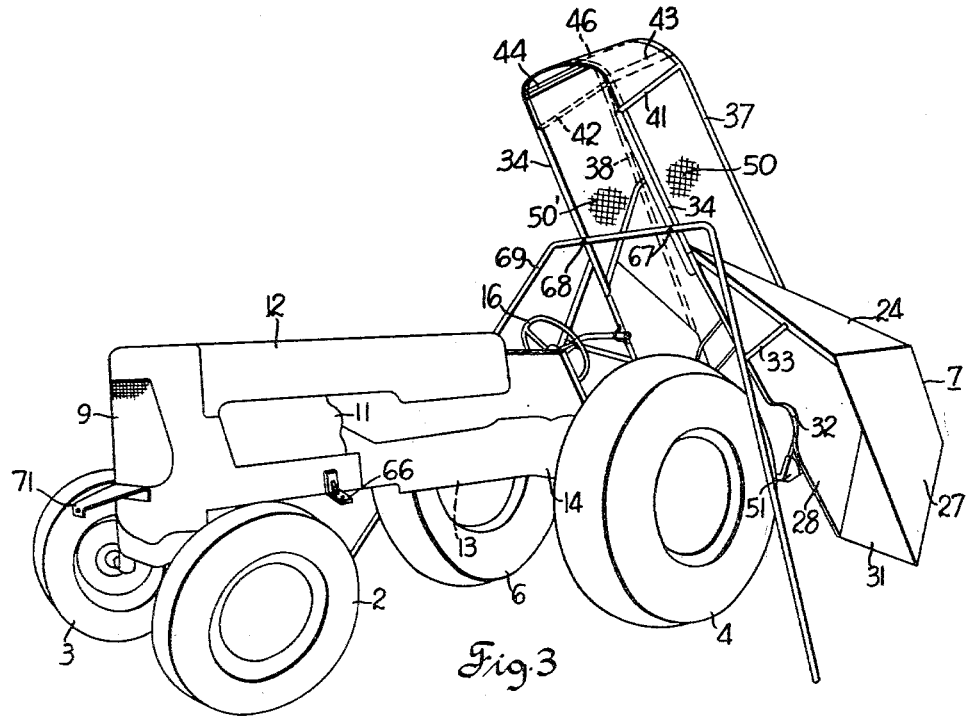
FIG. 3 is a perspective view showing the tractor and guard attachment of FIG. 2 detached from each other, the guard attachment being sustained in an upwardly tilted position by means of an auxiliary arch brace.
Figure 4:
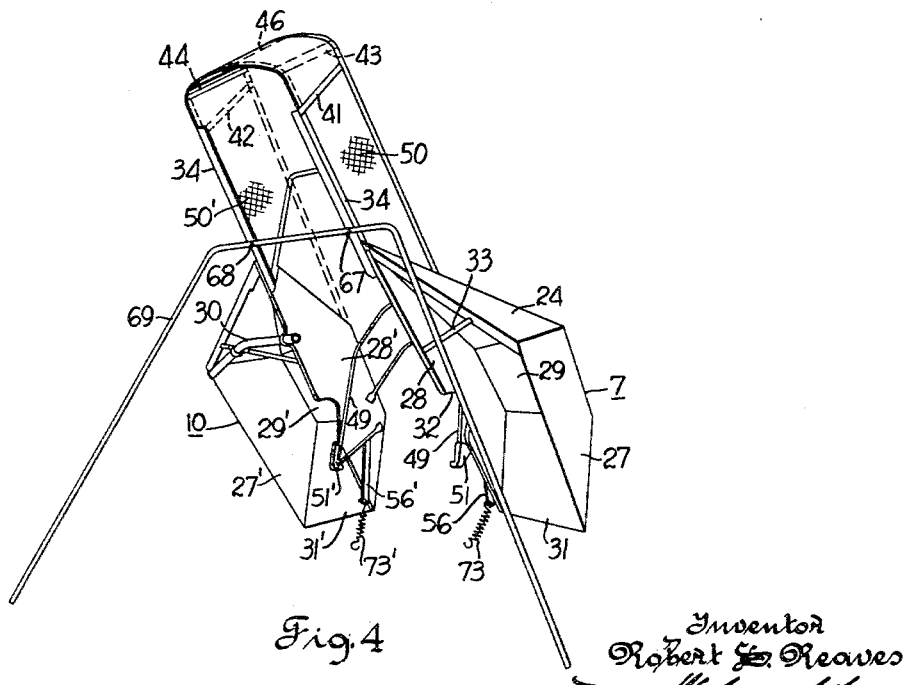
FIG. 4 is another perspective view of the guard attachment and associated arch brace shown in FIG. 3.

The fender section 7, as shown in FIGS. 1 and 2, comprises a triangular outward deflecting wall 24; a triangular upward deflecting wall 26; and a longitudinal, trapezoidal outer side wall 27. Further, as shown in FIG. 4, the fender section 7 comprises a longitudinal, generally trapezoidal inner side wall 28; a rectangular top wall 29, and a generally rectangular rear wall 31. All the walls 24 to 31 of the fender section 7 are made of sheet metal and integrally united, as by welding. In the installed condition of the guard attachment, as shown in FIGS. 1 and 5, the outer and inner fender side walls 27 and 28 extend vertically at the axially outer and inner sides, respectively, of the wheel 4, and the two side walls together with the deflecting walls 24, 26, top wall 29 and rear wall 31 shield the entire upper half of the rear wheel 4. The lower part of the longitudinal inner fender side wall 28 has a semicircular cutout 32 which in the installed condition of the guard structure on the tractor accommodates the adjacent side arm of the rear axle structure 14. A brace bar 33 extends between the lower edge portions of the inner side wall 28 and the outer deflecting wall 24 at a suitable forward distance from the cutout 32 so that the brace bar will clear the wheel 4 not only during pivotal movement of the guard structure about the pivot axis 23, but also during backward movement of the tractor into the guard attachment as will be explained more fully hereinbelow with reference to FIG. 3.

The foregoing explanations with reference to the fender section 7 analogously apply to the fender section 10 which comprises outer and inner side walls 27', 28', top and rear walls 29' and 31', as shown in FIG. 4, and triangular outward and upward deflecting walls corresponding to the deflecting walls 24 and 26 shown in FIG. 1. Mounted on the underside of the fender section 10 is an exhaust extension pipe 30 which lines up with an exhaust pipe on the tractor, not shown, when the guard attachment is positioned on the tractor in its lowered condition as shown in FIG. 1.

The cowl structure 8 comprises a lower U-shaped frame member 34 which in the installed condition of the guard attachment as shown in FIG. 1, extends horizontally forward from the fender sections 7 and 10, and around the forward end of the tractor body, the free ends of the U-shaped bottom frame member 34 being rigidly connected, as by welding, with the inner side walls 28, 28', respectively, of the fender sections 7 and 10. Also connected between the inner side walls 28, 28' of the fender sections and projecting upwardly therefrom, as shown in FIG. 7, is an arched frame member 36. As shown in FIG. 5, the arched frame member 36 forms the rear end of the cowl section 8 and is forwardly inclined away from the operator's seat 18, the radial spacing of the arched member 36 from the pivot axis 23 being ample to permit the arched member 36 to clear the operator's seat 18 when the guard attachment is swung from the horizontal position in which it is shown in FIGS. 1 and 5 to the upwardly tilted position in which it is shown in FIG. 2.

A generally U-shaped upper frame member of the cowl structure 8 comprises opposite longitudinal side beams 37, 38 and a transverse front member 39 interconnecting the beams 37, 38 at their forward ends. The front member 39 is made of sheet metal and die formed so as to present a vertically rounded, horizontally convex transverse front wall and rounded side corners which will smoothly deflect any tree branches with which they might come in contact. The rear ends of the beams 37, 38 are rigidly connected, as by welding, with the inner side walls 28, 28' of the fender sections 7 and 10. Transversely spaced upright struts 41, 42 extend upwardly from the forward part of the lower U-shaped frame member 34 and are connected at their upper ends with the forward ends of the upper longitudinal side members 37 and 38. The transverse front member 39 is connected with the forward part of the lower U-shaped frame member 34 by corner posts 43, 44 and by a center post 46, as best shown in FIG. 7.

Intermediate the rearward arched member 36 and the transverse front member 39, the cowl structure 8 is reinforced by three arched, generally upright, transverse frame members 47, 48 and 49. The frame member 47 has a pair of relatively long side legs which are secured at their lower ends to rearward portions of the U-shaped lower frame member 34. The arcuate top portion of the arched frame member 47 extends upwardly beyond the upper longitudinal side members 37, 38 to a height somewhat above the transverse front member 39, but lower than the height of the rear arched frame member 36.

The arched frame member 48 has relatively short side legs which are connected at their lower ends to the longitudinal side beams 37, 38. The height of the arched frame member 48 above the plane of the side members 37, 38 is somewhat greater than that of the arched frame member 47, but less than the height of the rearward arched member 36.

The arched frame member 49, as shown in FIGS. 5 and 7, has relatively long legs which extend along the inner sides of the inner fender side walls 28, 28', to which they are suitably secured as by bolting or welding. The height of the arched frame member 49 above the plane of the upper side members 37, 38 is somewhat greater than that of the arched frame member 48, but less than the height of the rearward arched member 36.

The U-shaped lower frame member 34, side beams 37, 38, front member 39, struts 41, 42, posts 43, 44, 46 and arches 36, 47, 48 and 49 afford a skeleton structure which is covered at its top by an arched perforated skin panel 40; at its front by a convex perforated skin panel 45, and at its opposite sides by perforated skin panels 50 and 50'. The skin panels are preferably made of expanded metal which is relatively light and affords a relatively large open area for the circulation of air through the entire cowl section and at the same time presents a relatively smooth outer surface for deflecting any tree branches and fruit with which it may come in contact.

The perforated top panel 40 is conically elongated and presents a longitudinally sectioned outside cone surface which extends lengthwise rearwardly from the transverse front member 39 at an upward slant and with gradually increasing transverse width towards the rear arch 36. The vertically arched apex end of the top panel 40 is rigidly secured, as by welding, to a rearwardly extending correspondingly arched top wall portion of the transverse top member 39, and the base end of the top panel 40 is suitably secured, as by clamps, not shown, to the correspondingly curved top portion of the rear arch 36. The intermediate arches 47, 48 and 49 are extended upwardly and curved to engage the inside surface of the conically elongated top panel, and suitable fasteners, such as bolts, not shown, secure the top panel 40 to the underlying intermediate arches 47, 48 and 49.

The perforated front panel 45 is wrapped around the center and corner posts 46, 43 and 44, and the opposite rearward ends of the front panel are secured to the struts 41 and 42, respectively. At its upper and lower ends, the front panel 45 is secured to the transverse front member 39 and to the forward part of the lower U-shaped frame member 34.

The perforated side panel 50, as shown in FIG. 5, is secured along its upper edge to the side beam 37; along its front edge to the strut 41; along its bottom edge to the side leg of the U-shaped bottom frame member in front of the fender section 7; and the rear part of the side panel 50 is secured to a flange portion 25 of the rearwardly and upwardly extending deflecting wall 26 of the fender section 7.

The perforated side panel 50' opposite to the panel 50 is secured to the side beam 38, strut 42, leg of U-shaped frame member 34 ahead of fender section 10, and to the upwardly and rearwardly inclined deflecting wall of the fender section 10 in the same manner as has been explained hereinbefore with reference to the panel 50.

As shown in FIG. 8, the side leg of the arched frame member 49 adjacent to the inner side of the fender section 10 is rigidly secured at its lower end to a sector shaped pivot bracket 51'. At its apex, the bracket 51' has a transverse generally cylindrical bearing portion 52' (FIG. 9) with an axial bore for the reception of a pivot bolt 53'. The side leg of the frame arch 49 adjacent the fender section 10 extends downwardly beyond the lower edge of the side wall 28', and the axis of the bearing portion 52' extends transversely of the fender section 10 in underlying relation thereto. The mounting of the pivot bracket 51' on the fender section 10 is reinforced by a brace rod 54' which is secured to the inner side of the fender side wall 28' in diverging relation to the associated side leg of the frame arch 49. A spring anchor bar 56' is secured to the inner side of the fender side wall 28' in rearwardly and downwardly diverging relation to the brace rod 54', the free end of the bar 56' presenting an opening 57' at a substantial radial rearward spacing from the axis of the pivot bearing 52'.

The other side leg of the frame arch 49 adjacent the inner side of the fender section 7 is rigidly secured to the inner fender side wall 28, and a pivot bracket 51 which is a duplicate of the pivot bracket 51' is secured to the other leg of the frame arch 49 in the manner explained hereinbefore with reference to FIG. 8. A brace rod 54 and spring anchor bar 56 shown in FIG. 5 correspond to the brace rod 54' and spring anchor bar 56' shown in FIG. 8, and are rigidly secured to the inner side of the side wall 28 of the fender section 7.

As shown in FIGS. 7 and 8, the pivot bracket 51' is straddled by a pair of transversely spaced bearing plates 58' and 59' which extend upwardly in transversely spaced relation to each other from a Z-shaped shelf bracket 61'. An upwardly extending side flange of the bracket 61' is bolted to the inner side of the final drive casing 21, and a downwardly extending flange of the bracket 61' is bolted to an adjacent upturned flange of a platform 62. A ramp plate 63' is rigidly secured between the bearing plates 58' and 59'. As shown in FIG. 9, the ramp plate 63' has an arcuate seat 64' in underlying, concentric relation with the axis of the pivot pin 53', and a guide lip 65' which extends rearwardly and downwardly from the seat 64'. In the assembled condition of the parts as shown in FIGS. 8 and 9, the pivot pin 53' extends through aligned holes in the bearing plates 58', 59' and through the axial bore of the pivot bracket 51' so as to pivotally support the guard attachment on the tractor at the axially inner side of the rear wheel 6. The seat 64' of the ramp plate 63' closely hugs the cylindrical underside of the bearing portion 52', so that the axial bore of the bearing portion 52' and the aligned bores of the bearing plates 58', 59' will be positioned in substantial registry with each other by cooperative supporting engagement of the seat 64' with the bearing portion 52', before the pivot pin 53' is installed on and after it has been withdrawn from the bearing plates 58', 59' and pivot bracket 51'.

As shown in FIG. 7, the pivot connection between the guard attachment and the tractor at the axially inner side of the wheel 6 is duplicated at the axially inner side of the wheel 4. That is, a Z-shaped shelf bracket 61, corresponding to the shelf bracket 61', is bolted to the inner side of the final drive housing 19 and mounts a pair of bearing plates 58, 59 and a ramp plate 63 corresponding to the bearing and ramp plates 58', 59' and 63'. A sector shaped pivot bracket 51 corresponding to the pivot bracket 51' is secured to the leg of the arch 49 adjacent the inner side of the fender section 7, and a pivot pin 53 extends through aligned bores of the bearing plates 58, 59 and through a registering bore of the pivot bracket 51 in alignment with the pivot pin 53' on the common transverse axis 23 (FIG. 5).

The platform 62 extends transversely between the depending flanges of the Z-shaped shelf brackets 61, 61' and it is secured to the shelf bracket 61 by means of an upturned flange and connecting bolts as explained hereinbefore with reference to FIG. 8. A drawbar assembly of the tractor is generally indicated by the reference character 70 and conforms with well known principles of construction and operation. The fender sections 7 and 10 are laterally spaced apart so as to clear the drawbar assembly 70 when the guard attachment is pivoted on the pins 53, 53' from the horizontal position in which it is shown in FIG. 1 to the upwardly tilted position in which it is shown in FIG. 2.

Downward swinging movement of the attachment about the axis 23 of the pivot pins 53, 53' is limited by a stop bracket 66 (FIG. 5) on the tractor which extends laterally outward therefrom under one leg of the lower U-shaped frame member 34, and by a similar stop bracket, not shown, which extends laterally outward from the tractor under the other leg of the frame member 34. Dowel pins 67 and 68 (FIG. 2) are secured to and extend downwardly from the side legs of the U-shaped lower frame member 34, and the stop brackets have suitable holes into which the dowel pins may enter when the guard attachment is swung into its lowered position as shown in FIG. 5. The dowel pins 67, 68 also serve to connect an arched prop structure 69 with the upwardly tilted guard attachment as shown in FIGS. 3 and 4, and as will be explained more fully hereinbelow.

A nose bracket 71 is mounted on the front end of the tractor, and a bolt 72 (FIG. 5) releasably connects the U-shaped lower frame member 34 with the nose bracket 71 when the attachment is in its lowered condition, the bolt extending through registering holes in the frame member 34 and nose bracket 71 so as to lock the guard attachment against upward swinging from its lowered position.

In order to facilitate upward swinging of the attachment on the transverse pivot axis 23 after removal of the locking bolt 72 from the nose bracket 71, a balancing spring 73 (FIG. 5) is operatively interposed between the fender section 7 and the tractor, and another balancing spring 73' (FIG. 8) is operatively interposed between the fender section 10 and the tractor. FIG. 6 is a partial top view of the platform 62 and associated parts which include an adjustable anchor bar 74 for the spring 73, and another adjustable anchor bar 74' for the spring 73'. The anchor bar 74 is pivotally secured to the underside of the platform 62 by a bolt 76 and nut thereon (FIG. 7), and the platform 62 has an arcuate slot 77 (FIG. 6) concentric with the bolt 76 in overlying relation to the inner end of the anchor bar 74. A cap screw 78 extends through the arcuate slot 77 and is threaded into a tapped hole of the underlying inner end of the bar 74. A washer is placed between the head of the cap screw 78 and the platform 62, and the cap screw is drawn up tightly into the anchor bar 74 so as to lock the anchor bar against pivotal displacement about the bolt 76. The outer end of the anchor bar 74 has a hole 79, and the spring 73 is hooked at one end into the hole 79 of the anchor bar 74, and at its other end into the hole 57 of the anchor bar 56 on the fender section 7.

The foregoing explanations regarding the mounting of the balancing spring 73 analogously apply to the balancing spring 73'. A pivot bolt 76' and associated nut mount the anchor bar 74' on the under side of the platform; a cap screw 78' extends through an arcuate slot 77' in the platform 62 and locks the anchor bar 74' in pivotally adjusted position; and the spring 73' is hooked at one end into a hole 79' in the outer end of the anchor bar 74', and at its other end into the hole 57' (FIG. 8) of the anchor bar 56' on the fender section 10.

In the horizontal position of the guard attachment as illustrated by FIG. 1, the tractor power plant which includes the radiator and grill assembly 9, the engine 11 with air intake 11', and the bonnet and fuel tank assembly 12, is effectively shielded at its front, top and sides by the cowl section 8 of the attachment; and the tractor rear wheels 4 and 6 are effectively shielded by the fender sections 7 and 10. The transverse front member 39 of the cowl section 8 extends over and shields the radiator filler cap 81 but also makes it inaccessible for servicing. Likewise, the filler cap 82 of the fuel tank is shielded but made inaccessible by the conically extended top panel 40 of the cowl section, and the engine 11 has the usual oil dip stick 83 and oil filler stud 84 which in the lowered position of the guard attachment are made inaccessible by the side panel 50 of the cowl section. However, the entire tractor power plant can be made readily accessible for servicing by simply unlocking the guard attachment from the nose bracket 71 and swinging it upward on the pivot axis 23 to a raised position such as illustrated by FIG. 2.

The balancing springs 73 and 73' are suitably proportioned and arranged so as to hold the guard attachment in its upwardly tilted position without the aid of the prop structure 69 which is shown in FIGS. 3 and 4.

Due to the relative proximity of the pivot axis 23 to the rear wheel axis 22 the fender sections 7 and 10 remain in substantially overlapping relation with the tractor rear wheels 4 and 6, respectively, when the guard attachment is swung from the horizontal position in which it is shown in FIG. 1 to the raised position in which it is shown in FIG. 2. If it should become necessary to remove one of the rear wheels from the tractor because of a flat tire, the most convenient procedure would be as follows. The guard attachment is swung upward to a position such as shown in FIG. 2, in which the rear edges of the fender sections 7 and 10 rest on the ground or on any suitable underlay, such as a wooden plank, not shown. The arch 69 which is shown in FIGS. 3 and 4 is then connected with the underside of the cowl section 8 by engaging the upper cross bar of the arch with the dowel pins 67, 68; a pair of holes matching the dowel pin being provided in the cross bar of the arch 69 which is preferably made of metal tubing. The diverging legs of the arch 69 are suitably spaced from each other to permit positioning of the arch on the ground in straddling relation to the tractor, the transverse spacing between the legs of the arch being ample to clear the rear wheels at opposite sides of the tractor. Upon installation of the arch as shown in FIGS. 3 and 4, most of the weight of the guard attachment is sustained at the rear edges of the fender sections 7 and 10 and on the arch 69. The pivot pins 53 and 53' are then withdrawn from the pivot brackets 51 and 51', respectively. Further, the cap screws 78 and 78' are backed up a few turns to release the spring anchor bars 74, 74' for pivotal movement about the bolts 76, 76'. As a result, the balancing springs 73, 73' will be slackened, and they are then unhooked from the anchor bars 74, 74'. The tractor is now free to be driven forwardly away from the guard attachment which remains standing on the ground in the propped up condition in which it is illustrated by FIGS. 3 and 4.

Referring to FIGS. 7, 8 and 9, it will be seen that forward movement of the tractor away from the propped up guard attachment will cause the ramp plates 63, 63' to slide forwardly from under the pivot brackets 51 and 51', respectively. During such movement the bearing portions 52 and 52' will be raised out of the seats 64, 64' and then slide gently down the guide lips 65, 65' of the ramp plates 63, 63'.

The described procedure of disconnecting the tractor from the guard attachment may be followed in reverse for connecting the tractor to the propped up guard attachment. In that case the tractor will be backed into the attachment, and the guide lips 65, 65' of the ramp plates 63, 63' will slide under the pivot brackets 51, 51', respectively. Continued backward movement of the tractor will cause the bearing portions 52, 52' to become seated in the seats 64, 64', whereupon the pivot pins 53, 53' will be inserted through the aligned holes of the bearing plates 58, 59 and 58', 59', respectively, and the associated pivot brackets 51, 51'. The rear portions of the bearing plates 58', 59' are flared outwardly as shown in FIG. 8 to guide the bearing portion 52' of the associated pivot bracket 51' into the space therebetween during the described backward movement of the tractor into the guard attachment. The bearing plates 58, 59 are similarly flared for guiding the bearing portion 52 of the pivot bracket 51 into the space therebetween.

It should be understood that it is not intended to limit the invention to the details of construction herein shown and described and that the invention includes such other forms and modifications as are embraced by the scope of the appended claims.

The embodiments of the invention in which an exclusive property or privilege is claimed are defined as follows:

1. In an orchard tractor, the combination of:
   a self-contained tractor unit including a forward power plant, a transverse rear axle structure, and a pair of propelling wheels at the opposite ends, respectively, of said axle structure;
   a unitary guard attachment adapted for mounting over said power plant and propelling wheels in a generally horizontal position and comprising a cowl section for shielding the front, top and sides of said power plant, and a pair of fender sections, each having longitudinal inner and outer side walls connected by transverse walls, for shielding upper portions of said propelling wheels;
   a pair of pivot brackets mounted on said inner side walls of said fender sections; and
   means including pivotal connections between said pivot brackets and said rear axle structure for securing said guard attachment to said tractor unit in up and down swingable relation thereto about a generally horizontal transverse pivot axis.

2. The combination set forth in claim 1 wherein said pivotal connections between said pivot brackets and said rear axle structure each comprise:
   a support having a pair of laterally spaced bearing plates in straddling relation to the respective pivot bracket;
   a ramp plate between said bearing plates presenting an arcuate seat for said respective pivot bracket; and
   a pivot pin extending through said bearing plates and pivot bracket.

3. The combination set forth in claim 1 and further comprising a pair of balancing springs operatively mounted on said tractor unit and connected, respectively, with said fender sections at points spaced radially from said transverse pivot axis so as to bias said guard attachment for rearward and upward swinging movement relative to said tractor unit about said pivot axis.

4. For use on a tractor having a forward power plant and a pair of transversely spaced rear wheels, a unitary guard attachment comprising a cowl section having front, top and side panels for shielding the front, top and sides, respectively, of said power plant, a pair of fender sections for shielding said tractor rear wheels, each of said fender sections comprising longitudinal inner and outer side walls, lateral and upward deflecting walls connecting forward portions of said side walls, and top and rear walls connecting upper and rearward portions of said side walls; and a pair of pivot brackets mounted on said fender sections, respectively, for pivotal connection with said tractor.

5. A guard attachment as set forth in claim 4, wherein said pivot brackets are mounted on the inner sides of said fender sections, respectively, in downwardly projecting relation thereto.

6. A guard attachment as set forth in claim 4, wherein said top panel of said cowl section is conically elongated and presents a sectioned cone surface having a base end intermediate said fender sections, and an apex end forwardly thereof.

7. A guard attachment as set forth in claim 4 wherein said cowl section comprises a skeleton structure of longitudinally and transversely extending, interconnected frame members, and wherein said front, top and side panels of said cowl section are mounted on said skeleton structure and are perforated to present relatively large open areas for the circulation of air through said cowl section.

8. The combination of a guard attachment as set forth in claim 4 and an arched prop structure for said attachment, said prop structure comprising a transverse top portion releasably connected with the underside of said cowl section, and a pair of transversely spaced supporting legs adapted to sustain said attachment in an upwardly tilted position while it is supported at the rear ends of said fender sections independently of said pivot brackets.

References Cited by the Examiner
UNITED STATES PATENTS

| | | | |
|---|---|---|---|
| 1,598,868 | 9/26 | Lundelius | 180—69 |
| 2,169,449 | 8/39 | McCormick | 180—1 |
| 2,211,654 | 8/40 | Heaslet | 280—152 |
| 2,232,377 | 10/43 | Haltenberger | 180—69 |
| 2,451,553 | 10/48 | Hedquist et al. | 180—1 |

FOREIGN PATENTS

| | | |
|---|---|---|
| 293,148 | 7/28 | Great Britain. |

A. HARRY LEVY, *Primary Examiner.*

PHILIP ARNOLD, *Examiner.*